April 14, 1931.  C. B. COATES  1,800,248
QUADRUPLEX EQUALIZING APPARATUS
Filed March 23, 1928  2 Sheets-Sheet 1

INVENTOR.
Charles B. Coates
BY
Ira L. Nickerson
ATTORNEY.

April 14, 1931.  C. B. COATES  1,800,248
QUADRUPLEX EQUALIZING APPARATUS
Filed March 23, 1928   2 Sheets-Sheet 2

INVENTOR.
Charles B. Coates
BY
Ira L. Nickerson
ATTORNEY.

Patented Apr. 14, 1931

1,800,248

UNITED STATES PATENT OFFICE

CHARLES B. COATES, OF CLEVELAND, OHIO, ASSIGNOR TO CHICAGO PNEUMATIC TOOL COMPANY, OF NEW YORK, N. Y., A CORPORATION OF NEW JERSEY

QUADRUPLEX EQUALIZING APPARATUS

Application filed March 23, 1928. Serial No. 264,194.

This invention has to do with the driving of securing members such as nuts, bolts, studs, screws, etc. in the erecting or assembly of engines, automobiles and machines generally, and is in the nature of an improvement or further development of the inventive idea disclosed in my copending application Serial No. 264,193, filed of even date herewith.

Among the objects of the invention are to economize time and labor, to set up a relatively large number of securing members simultaneously and to the same degree of tightness, to permit such work to be done by relatively unskilled labor, to reduce or to eliminate inspections, and in general to speed up work while improving its quality.

The invention involves apparatus which will operate upon four or more securing members at the same time, equalizing the application of power thereto so that they are set up together in one operation to the same degree of tightness. By preference the invention takes the form of an attachment readily applicable to known types of power machines and tools.

In order to illustrate the invention one concrete embodiment thereof is shown in the accompanying drawings in which.

Figure 1:
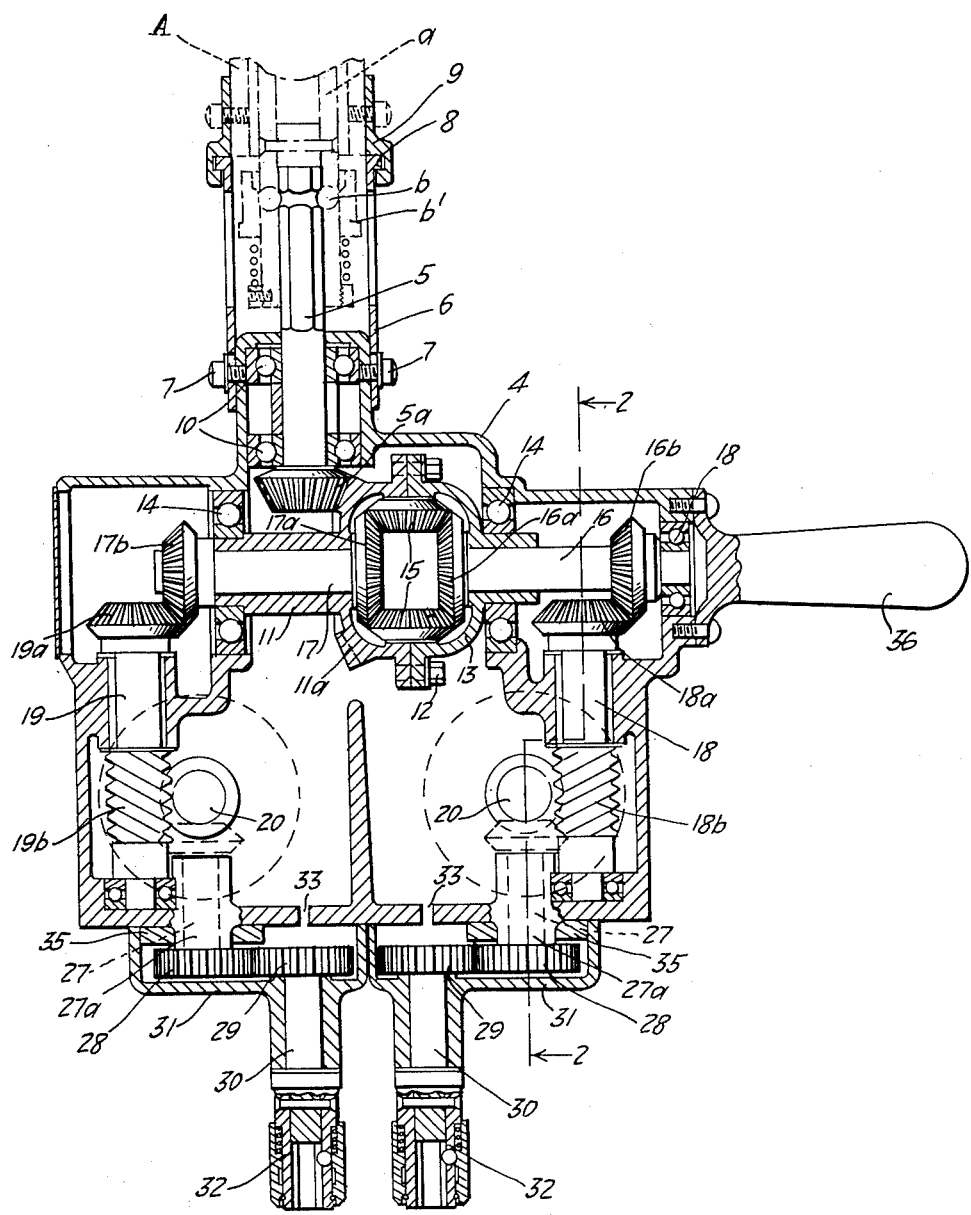
Fig. 1 is a vertical central sectional view substantially on the line 1—1 of Fig. 2 showing the attachment in operative relation with a driving spindle of a machine or tool.

The form of the invention chosen for the purpose of illustration consists of a compact device or attachment conveniently applicable to the rotatable member of a fixed machine or portable tool. It consists of a casing 4 from which projects a driving spindle 5 of suitable shape on its outer end for connection with a rotatable member, such as the spindle $a$ of a machine or tool, a fragmentary portion of which is indicated at A. Spindles 5 and $a$ may be locked in operative engagement by any suitable means, such as a locking ball $b$ controlled by spring-pressed locking sleeve $b'$. Additional means for maintaining the attachment in operative relation with machine A may comprise a sleeve 6 secured to casing 4 by stud bolts 7 and having a radially projecting flange 8 on its outer end engaged by semi-circular plates 9 on machine A.

Figure 2:
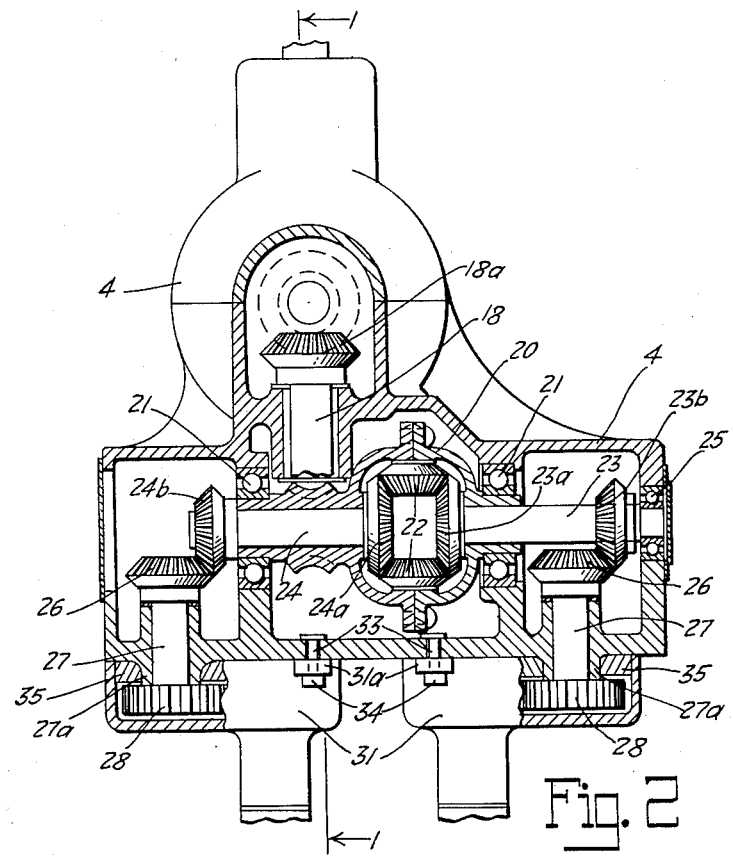
Fig. 2 is a transverse sectional view on the broken line 2—2 of Fig. 1.

Spindle 5 is rotatably supported in bearings 10 in casing 4 and has on its inner end a mitre gear 5$a$ meshing with a ring gear 11$a$ on a half-housing 11 to which is secured, as by bolts 12, a complementary half-housing 13. Housings 11, 13 are supported in bearings 14 in casing 4. Within the housings is a disposed differential gearing including idler gears 15 which mesh with gears 16$a$ and 17$a$ on shafts 16 and 17 respectively which are journalled in differential housings 13, 11. Shaft 16 has on its outer end a bearing 18 in casing 4. Shafts 16 and 17 have adjacent their outer ends gears 16$b$ and 17$b$ in mesh with gears 18$a$ and 19$a$ on vertical shafts 18 and 19 respectively which are suitably journalled in casing 4. These shafts have worm gear driving connections at 18$b$ and 19$b$ respectively with two spaced differential housings 20 extending beneath differential housing 11, 13 but transversely thereof. Each differential housing 20 is suitably supported in bearings 21 (Fig. 2) in casing 4. Within each housing 20 is mounted differential gearing including idler gears 22 in mesh with gears 23$a$ and 24$a$ on shafts 23 and 24 which shafts are journalled in the differential housing. Each of shafts 23 may have a bearing 25 in casing 4. Shafts 23 and 24 have gears 23$b$ and 24$b$ respectively in mesh with gears 26 on spaced vertically disposed shafts 27 in casing 4 and projecting therebeyond. The projecting ends of shafts 27 carry spur gears 28 which mesh with cooperating spur gears 29 on spindles 30 (four in number) which are journalled in housings 31 secured to the bottom of casing 4. The outer ends of spindles 30 carry chucks 32 of any suitable or desired type adapted to engage the securing members directly or to have sockets inserted therein to fit the securing members.

Figure 3:
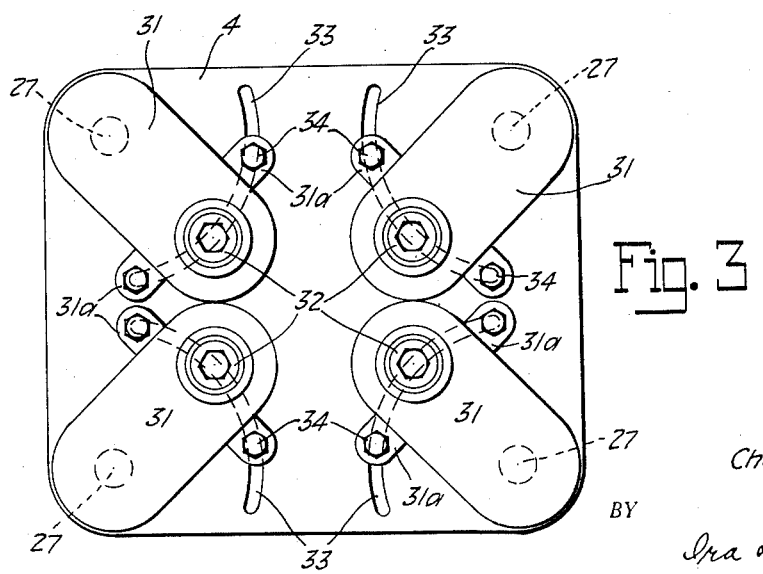
Fig. 3 is a bottom plan view of the attachment.

The housings 31 may be secured to casing 4 in fixed position for any specific nut running or other securing member job, in which case a special housing head or casing will be required for each job, because the spindles are at fixed center distances. However, the invention contemplates an adjustable arrangement for housings 31 so that a single attachment may be conveniently adjusted to take care of journal caps and other securing pieces having four securing members with a limited variation in the center distances between the members. To this end housings 31 are made adjustable about shafts 27 as centers and are arranged to be clamped in adjusted position by suitable means which may comprise arcuate slots 33 in casing 4 slidably receiving clamping bolts 34 which extend through perforated ears 31a on housings 31. By preference casing 4 provides bearing bosses 27a for shafts 27, which bosses extend within the respective housings 31 and upon these bosses are mounted guide rings 35 (Fig. 1 and 2) cooperating with housings 31 and adapted to maintain the same in proper operative relation with shafts 27. Fig. 3 shows adjustable housings 31 at one limit of their adjusted movement. In adapting an attachment of this type to journal caps, it is frequently necessary to change the adjustment of only two of the housings 31. At other times it may be necessary to adjust three or even all four of them.

In utilizing the attachment in connection with a rotatable member driven from any suitable source of power such as a flexible shaft, or the spindle of a drill press, or of a portable pneumatic or electrical tool, or other machine, the operator first adjusts housings 31 so that the chucks 32, or sockets therein, fit over the securing members to be driven (in the event that casing head is not arranged for fixed center distances). He then utilizes one or more handles 36 (Fig. 1) to adjust the attachment over the journal box. Once this is done, he no longer need hold the handle because the four spindles in engagement with the nuts to be driven will hold the attachment from turning. A rotative impulse then imparted to spindle 5 of the attachment is transmitted through the various shafts and gearings including the main differential 11, 13 and the subordinate differential 20 simultaneously to set up the nuts or other securing members. If one nut bottoms first or is harder to set up than the rest, the other nuts are driven home faster through the differential action until the resistance of all the nuts is the same. Whereupon all will be set up to the same degree of tightness in one operation. By preference the connection with the driving motor is such that the attachment will be disconnected by the releasing chuck on the motor when the desired degree of torque has been applied.

From the above it will be apparent that the present invention is adapted for driving simultaneously to the same degree of tightness a plurality of securing members whose numbers are in geometric progression with two as a factor and that the number of differentials required will be one less than the number of securing members to be driven. For example, the attachment disclosed in my aforesaid copending application for driving two securing members has one differential. The attachment shown in the present application which drives four securing members has three differentials. Accordingly an attachment to drive eight securing members will have seven differentials, etc.

While the present invention has been herein disclosed in what is now considered to be a preferred form, it is apparent that practical forms of the same are capable of considerable modification and variation without departing from the spirit and scope of the invention, all which changes and modifications are intended to be covered by the appended claims.

I claim as my invention:

1. In apparatus for driving a plurality of securing members simultaneously to the same degree of tightness a rotatable spindle, four spindles in juxtaposed parallelism, and means for transmitting the rotation of said first spindle differentially to said four spindles.

2. In apparatus for setting up a plurality of threaded members simultaneously to the same degree of tightness a rotatable spindle, four spindles in juxtaposed parallelism, means for transmitting the rotation of said first spindle differentially to said four spindles, and means for adjusting the distances between said parallel spindles.

3. An attachment for use with a rotation motor for driving a plurality of securing members simultaneously to the same degree of tightness comprising a casing having a single driving member projecting from one side for connection to the motor and four driven members projecting from another side, and transmission mechanism within said casing establishing a differential driving connection between said driving member and said driven members.

4. An attachment for driving a plurality of securing members simultaneously to the same degree of tightness, said attachment having more than two driven spindles and transmission means therefor comprising differentials one less in number than the number of driven spindles.

5. An attachment for simultaneously setting up four securing members to the same degree of tightness, said attachment having four driven spindles and transmission means therefor comprising three differentials.

6. An attachment for use with a rotatable member for setting up a plurality of threaded securing members simultaneously to the same degree of tightness comprising a casing having a single driving member projecting therefrom on one side for connection to said rotatable member, four driven members projecting from another side, and a transmission within said attachment for imparting the rotation of said driving member to said driven members including spaced series of vertical and horizontal shafts and a plurality of differentials associated with said shafts.

7. An attachment for use with a rotatable member for setting up a plurality of threaded securing members simultaneously to the same degree of tightness comprising a casing having a single driving member projecting therefrom on one side for connection to said rotatable member, four driven members projecting from another side, and a transmission within said attachment for imparting the rotation of said driving member to said driven members including spaced series of vertical and horizontal shafts and a differential in operative relation with each horizontal shaft.

8. An attachment for use with a rotatable member for setting up a plurality of threaded securing members simultaneously to the same degree of tightness comprising a casing having a single driving member for connection with said rotatable member, a differential within said casing driven by said driving member, two differentials driven from said first differential, and a spindle driven from each end of both of said two differentials, said spindles having their ends in juxtaposed parallelism for engagement with securing members disposed in the same plane.

9. An attachment for use with a rotatable member for setting up a plurality of securing members simultaneously to the same degree of tightness comprising a casing having a single member for connection with said rotatable member, a main differential within said casing, two additional differentials, a driving connection including worm gearing between one end of said main differential and each of said additional differentials, a spindle driven from each end of both of said additional differentials, and means on the ends of said spindles for driving engagement with the securing members.

10. In apparatus for setting up securing members simultaneously to the same degree of tightness, a rotatable shaft, a main differential disposed transversely of said shaft and driven by the latter, shafts extending in parallelism with each other as well as with said main shaft and driven from the ends of said main differential, two additional differentials disposed transversely of said last named shafts and in parallelism with said main differential, worm gearing connections between said additional differentials and said last named shafts, and spindles in juxtaposed parallelism connected to the opposite ends of said additional differentials and having means for engaging securing members disposed in the same plane.

Signed by me at Cleveland, in the county of Cuyahoga and State of Ohio, this 20th day of March, 1928.

CHARLES B. COATES.